(12) United States Patent
Kawashima et al.

(10) Patent No.: US 8,303,152 B2
(45) Date of Patent: Nov. 6, 2012

(54) SPREAD ILLUMINATING APPARATUS

(75) Inventors: Satoshi Kawashima, Kitasaku-gun (JP); Makoto Furuta, Kitasaku-gun (JP)

(73) Assignee: Minebea Co., Ltd, Kitasaku (JP)

( * ) Notice: Subject to any disclaimer, the term of this patent is extended or adjusted under 35 U.S.C. 154(b) by 268 days.

(21) Appl. No.: 12/776,754

(22) Filed: May 10, 2010

(65) Prior Publication Data
US 2010/0296284 A1 Nov. 25, 2010

(30) Foreign Application Priority Data
May 20, 2009 (JP) ................................. 2009-121541

(51) Int. Cl.
F21V 7/04 (2006.01)

(52) U.S. Cl. ........ 362/612; 362/231; 362/613; 362/621; 362/628; 349/65

(58) Field of Classification Search .................. 362/231, 362/235, 611–613, 621, 622, 628; 349/65
See application file for complete search history.

(56) References Cited

U.S. PATENT DOCUMENTS

| | | | | |
|---|---|---|---|---|
| 7,401,965 B2 * | 7/2008 | Xu et al. | ......................... | 362/621 |
| 7,789,549 B2 * | 9/2010 | Tanabe | ........................... | 362/621 |
| 7,905,649 B2 * | 3/2011 | Yang et al. | ..................... | 362/612 |
| 2007/0253218 A1 * | 11/2007 | Tanabe | ........................... | 362/612 |
| 2008/0055925 A1 | 3/2008 | Masamoto et al. | | |
| 2008/0186733 A1 | 8/2008 | Ho et al. | | |
| 2009/0080216 A1 | 3/2009 | Tanabe | | |
| 2009/0135625 A1 | 5/2009 | Yang et al. | | |

FOREIGN PATENT DOCUMENTS

JP  A-2007-73399  3/2007

OTHER PUBLICATIONS

Sep. 6, 2010 Search Report issued in European Patent Application No. 10005026.9.

\* cited by examiner

*Primary Examiner* — Stephen F Husar
(74) *Attorney, Agent, or Firm* — Oliff & Berridge, PLC

(57) ABSTRACT

A spread illuminating apparatus includes: a light guide plate including a plurality of protrusions disposed along a side surface thereof such that a plurality of interspaces are formed with each interspace being located between two adjacent protrusions; and a plurality of LEDs which include first row LEDs and second row LEDs disposed in two rows respectively at the interspaces and the protrusions. The distal portion of the protrusion has, at its top end surface, a width which is larger than the width of an opening area of the recess of a lamp house and also smaller than the overall width of the lamp house. The first and second row LEDs adjacent to each other are disposed such that respective lamp houses of two adjacent LEDs partly overlap with each other when viewed from the light emission direction.

3 Claims, 4 Drawing Sheets

SPREAD ILLUMINATING APPARATUS

BACKGROUND OF THE INVENTION

1. Field of the Invention

The present invention relates to a spread illuminating apparatus of side light type in which a light source is arranged at a side surface (light entrance surface) of a light guide plate, and more specifically to a spread illuminating apparatus in which a plurality of point light sources are arranged in a plurality of rows along a side surface of a light guide plate.

2. Description of the Related Art

A side light type spread illuminating apparatus is advantageous in reducing the profile dimension and therefore is widely used as a lighting means for a liquid crystal display (LCD) panel particularly in small portable information devices such as cell-phones. A light emitting diode (LED), which is a point light source and highly environmentally compatible, is widely used as a light source arranged at a side surface of a light guide plate.

Recently, in order to keep up with the ever refining definition and enhancing performance of the LCD panel, it is requested to further increase the brightness of such a spread illuminating apparatus. A side light type spread illuminating apparatus is disclosed in which a plurality of LEDs are arranged in a plurality of rows at a side surface of a light guide plate so as to improve the brightness (refer to, for example, Japanese Patent Application Laid-Open No. 2007-73399).

FIG. 4 indicates an illumination apparatus 50 disclosed in Japanese Patent Application Laid-Open No. 2007-73399. The illumination apparatus 50 includes a light guide plate 51 having a rectangular shape and a plurality of LEDs 52 arranged at one side surface of the light guide plate 51. The one side surface of the light guide plate 51 includes a plurality of recesses 53 and a plurality of protrusions 54, which are arranged alternately so as to form a rectangular wave shape as a whole, and the LEDs 52 are arranged individually at the recesses 53 and the protrusions 54, specifically such that the LEDs 52 are arrayed in two straight rows so as to form a zigzag arrangement. A pair of terminals 52a are disposed on the respective sides of each of the LEDs 52 and soldered at a terminal (not shown) of a flexible printed board 55.

When a plurality of LEDs are disposed in a zigzag manner as described above, as many LEDs as possible can be accommodated without contact of neighboring terminals each disposed on the side of two adjacent LEDs, and a spread illuminating apparatus with a high brightness can be realized. However, it is ever and constantly requested to increase the brightness of a spread illuminating apparatus. Especially, it is strongly requested to develop a spread illuminating apparatus which can accommodate as many LEDs as possible so that one spread illuminating apparatus can emit two or more kinds of lights having respective different wavelength characteristics.

SUMMARY OF THE INVENTION

The present invention has been made in light of the above circumstances, and it is an object of the present invention to provide a spread illuminating apparatus of side light type which efficiently accommodates as many LEDs as possible so as to provide excellent brightness.

In order to achieve the object described above, according to an aspect of the present invention, there is provided a spread illuminating apparatus including: a light guide plate including a plurality of protrusions disposed along a side surface thereof such that a plurality of interspaces are formed with each interspace being located between two adjacent protrusions; and a plurality of point light sources which are disposed in two rows respectively at the interspaces and the protrusions and which each comprise a light emitting element chip, and a lamp house made of a reflective material and having a recess for storing the light emitting element chip at a center part thereof, wherein each of the protrusions integrally includes a proximal portion which extends from the side surface of the light guide plate and which has a substantially constant width and a distal portion which extends further from the proximal portion and which has a width increasing in accordance with an increase in distance from the proximal portion, and wherein the distal portion of the protrusion has, at its top end surface, a width which is larger than the width of an opening area of the recess and also smaller than the overall width of the lamp house.

In the aspect of the present invention, the plurality of point light sources disposed in two rows may be arranged such that respective lamp houses of two adjacent point light sources partly overlap with each other when viewed from the light emission direction.

In the aspect of the present invention, the plurality of point light sources disposed in two rows may have respective wavelength characteristics different from one row to another.

In the spread illuminating apparatus according to the present invention, the light guide plate includes the protrusions each including the distal portion whose width increases in accordance with an increase in distance from the light guide plate and whose width at its top end surface is larger than the width of the opening area of the recess of the lamp house of the point light source and also smaller than the overall width of the lamp house. With the arrangement described above, much of the light emitted from the light emitting surface of the point light source can be introduced into the light guide plate and at the same time as many number of the point light sources as possible can be disposed at a side surface of the light guide plate. Also, since the distal portion of the protrusion has a width larger than the width of the opening area of the recess having the point light source therein, the point light source is allowed to be shifted in location with respect to the protrusion, whereby the light emitted from each point light source can be stably introduced into the light guide plate.

DETAILED DESCRIPTION OF THE INVENTION

An exemplary embodiment of the present invention will hereinafter be described with reference to the accompanying drawings.

Figure 1:
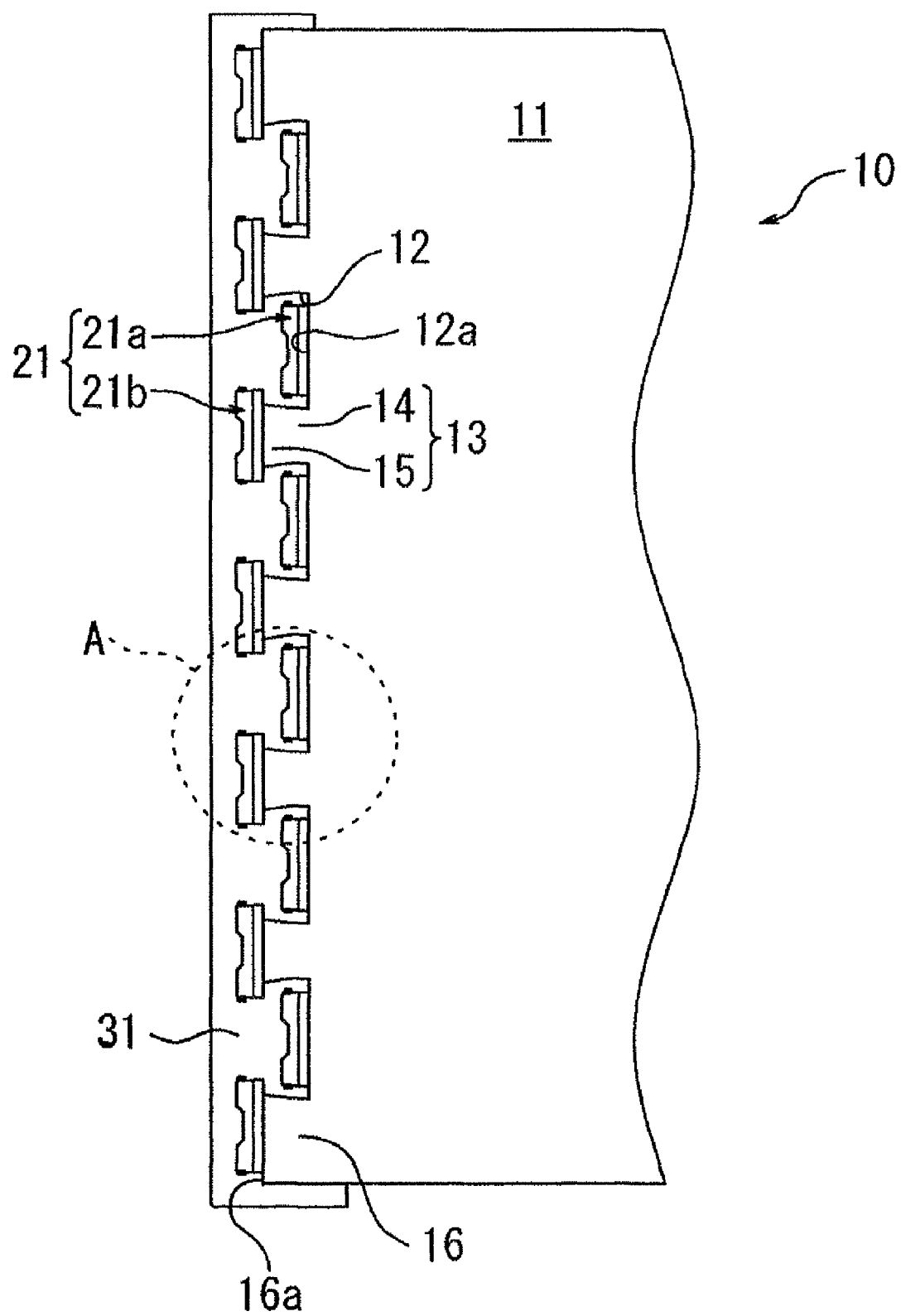
FIG. 1 is a schematic top plan view of a relevant portion of a spread illuminating apparatus according an embodiment of the present invention.

Referring to FIG. 1, a spread illuminating apparatus 10 includes: a light guide plate 11 having a rectangular shape; a plurality of LEDs 21 which are point light sources and arrayed in two rows along one side surface of the light guide plate 11; and an FPC (Flexible Printed Circuit) board 31 which has an oblong rectangular shape and on which the plurality of LEDs 21 are disposed, wherein light emitted from each of the LED 21 enters the light guide plate 11 from the one side surface and exits from a major surface thereof. Optical sheets (not shown), such as a prism sheet, a diffusion sheet and the like are arranged in layers on one major surface of the light guide plate 11 and a reflection sheet (not shown) is disposed on the other major surface of the light guide surface 11.

The light guide plate 11 is made of a transparent material (polycarbonate resin in the embodiment). The light guide plate 11 includes a plurality (five in the embodiment) of protrusions 13 disposed along the one side surface thereof having the LEDs 12 and two end protrusions 16 located respectively at both ends of the one side surface, wherein a plurality (six in the embodiment) of interspaces 12 are formed such that the protrusion 13 and the interspace 12 are alternately disposed between the two end protrusions 16 along the longitudinal direction of the one side surface of the light guide plate 11.

Specifically, the interspaces 12 are open spaces each defined between two adjacent protrusions 13 and also between one end protrusion 16 and one protrusion 13. The interspaces 12 have an identical shape to one another and defines a bottom surface 12a having a width (dimension along the longitudinal direction of the one side surface of the light guide plate 11) which is set to be slightly larger than the overall width (dimension along the longitudinal direction of the one side surface) of the LED 21.

Figure 2:
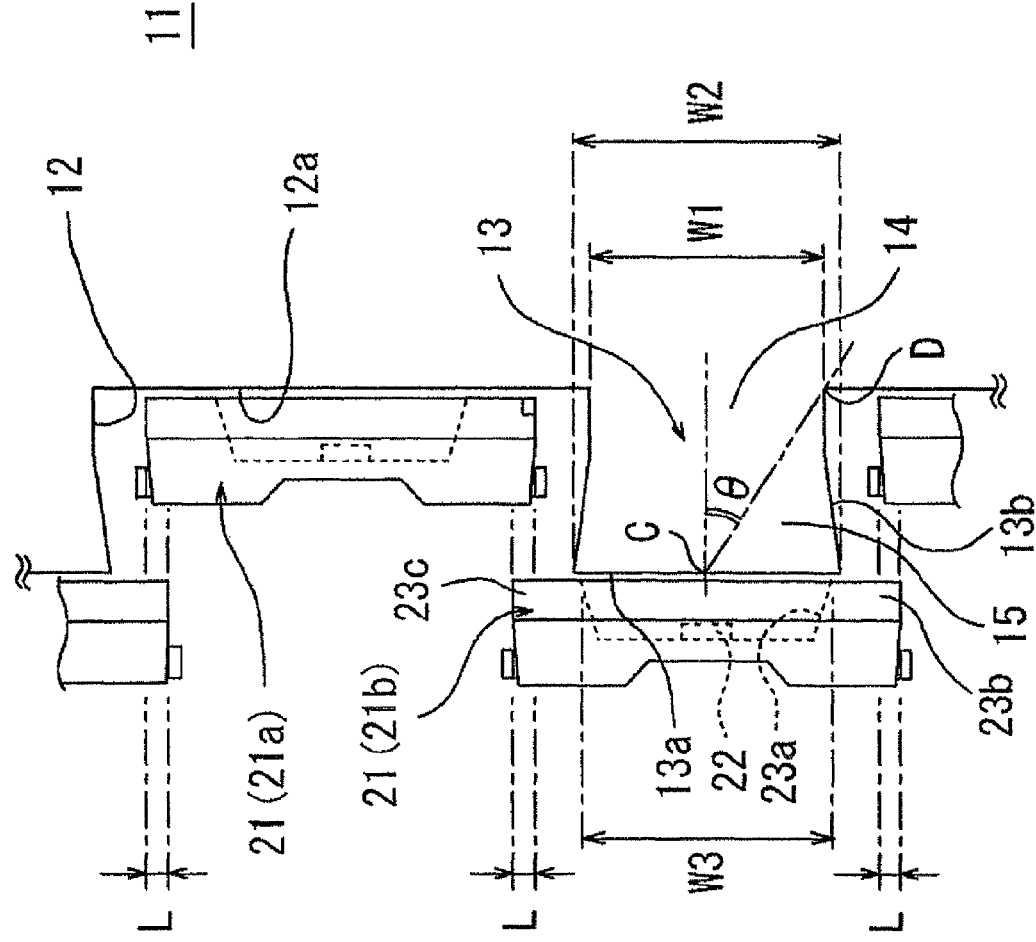
FIG. 2 is a enlarged view of a portion surrounded by a dashed-line circle A in FIG. 1.

As shown in FIG. 2, the protrusions 13 extend from the one side surface (at which the LEDs 21 are disposed) of the light guide plate 11 and each integrally include a proximal portion 14 located toward the light guide plate 11 and a distal portion 15 extending further from the proximal portion 14 so as to be located far from the light guide plate 11.

The proximal portions 14 have a rectangular shape in plan view and have a constant width W1 (dimension along the longitudinal direction of the one side surface of the light guide plate 11). The distal portions 15, on the other hand, have a trapezoidal shape in plan view and are formed such that the width (dimension along the longitudinal direction of the one side surface) increases at a constant rate in accordance with an increase in distance from the proximal portion 14 so as to define a maximum width W2 at a top end surface 13a of the protrusion 13, wherein the width W2 is larger than the width W1.

The protrusion 13 is formed such that an inclination degree θ of a line connecting between a center point C of the top end surface 13a and a corner point D (cross point between the side surface of the of the proximal portion 14 and the bottom surface 12a of the interspace 12) is set at 32 degrees with respect to the center line (orthogonal to the top end surface 13a) of the protrusion 13. The inclination degree θ is preferably set at 20 degrees or more, because if the inclination degree θ is set below 20 degrees, the directivity of light emission increases thus causing the deterioration of the brightness uniformity of illumination light.

Referring to FIG. 1 again, the end protrusions 16 each integrally include a proximal portion having a rectangular shape in plan view which corresponds to the proximal portion 14 of the protrusion 13 and a distal portion having a half-trapezoidal shape in plan view which corresponds to the distal portion 15 of the protrusion 13. The width of the end protrusion 16 is larger than the width of the protrusion 13 in the embodiment. The end protrusions 16 are not an essential element in the present invention, and even when the light guide plate 11 is provided with the end protrusions 16, the LED 21 does not necessarily have to be disposed at the end protrusions 16.

In the embodiment, a so-called incident light prism is provided on the bottom surface 12a of the interspace 12 so as to optimize the spread angle of incident light, but the incident light prism is not provided on the top end surface 13a of the protrusion 13 nor on a top end surface 16a of the end protrusion 16.

The plurality of LEDs 21 arranged in two rows at the one side surface of the light guide plate 11 will hereinafter be described. The LEDs 21 include a plurality (six in the embodiment) of first row LEDs 21a each arranged in the interspace 12 and a plurality (seven in the embodiment) of second row LEDs 21b each arranged at the protrusion 13 and the end protrusion 16. The first row LED 21a and the second row LED 21b are identical to each other and therefore will be referred to collectively as the LED 21 except the case where the first row LED 21a and the second row LED 12b must be distinguished from each other.

Figure 3A:
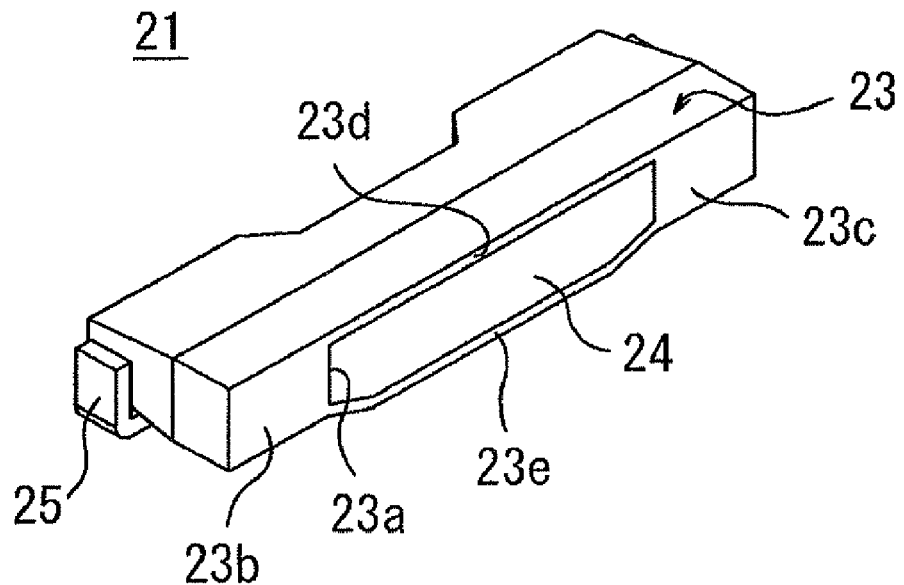
FIG. 3A is a perspective view of an LED.
Figure 3B:
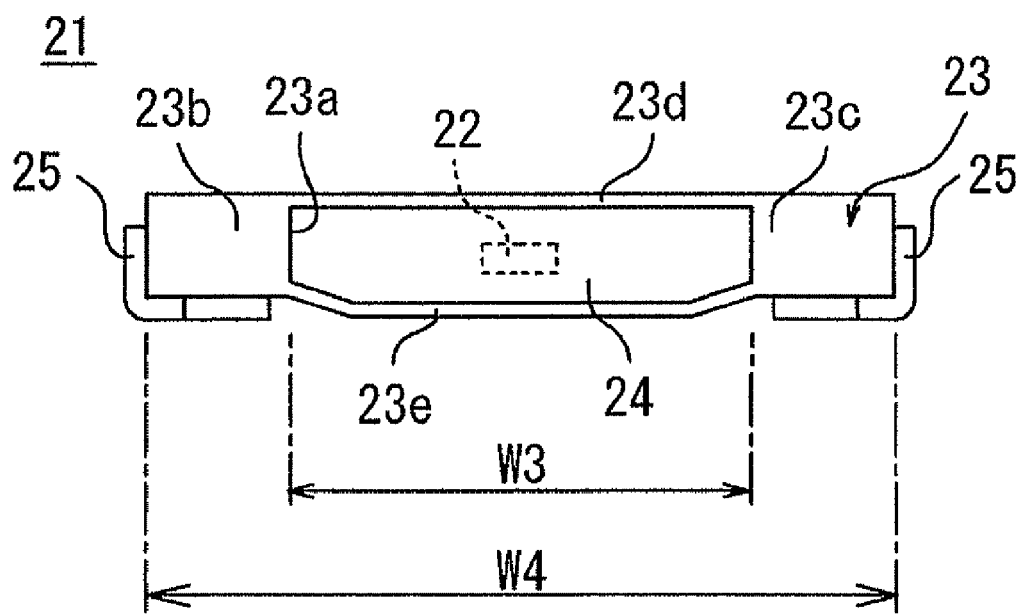
FIG. 3B is an elevation view of the LED viewed from a light emission surface.
Figure 4:
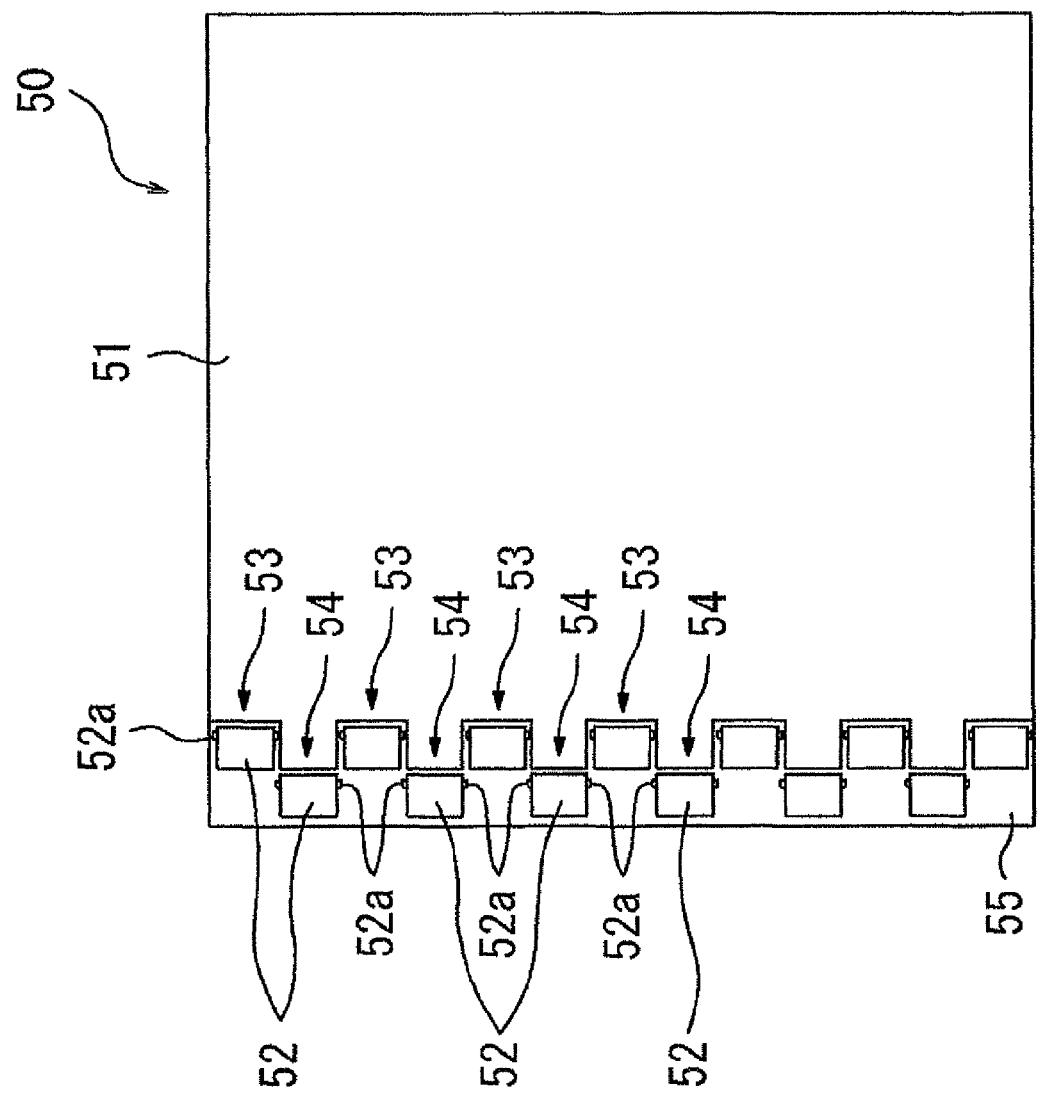
FIG. 4 is a schematic top plan view of a conventional spread illuminating apparatus.

Referring to FIGS. 3A and 3B, each LED 21 includes an LED chip 22 (which is also called a dice), a lamp house 23 for storing the LED chip 22 at the center part thereof, a sealing portion 24 formed at the center part of the lamp house 23 so as to cover the LED chip 22, and a pair of electrode terminals 25 disposed on the lamp house 23 so as to be partly exposed respectively at the both ends of the lamp house 23 opposing each other in the longitudinal direction.

In the embodiment, the LED chip 22 is a blue LED chip which emits a blue light having a wavelength of 410 nm to 480 nm. The LED chip 22 is electrically connected to the electrode terminals 25 by a bonding wire (not shown).

The lamp house 23 is made of a white resin (in the embodiment, liquid polymer in which oxidized titanium is dispersed) as a light reflective material and formed into a substantially rectangular body with a recess 23a provided at the center. The LED chip 22 is mounted on a bottom surface of the recess 23a. The recess 23a has an opening with a substantially rectangular shape. Thus, the lamp house 23 includes four walls, specifically, a left end wall 23b, a right end wall 23c, an upper side wall 23d and a lower side wall 23e located respectively at the left and right ends, and the upper and lower sides in FIG. 3B.

Each of the walls 23b, 23c, 23d and 23e is formed with its inner surface inclined so that the wall width decreases in accordance with an increase in distance from the bottom surface toward the opening plane of the recess 23a (refer to FIG. 2). Accordingly, the inner surface of each of the walls 23b, 23c, 23d and 23e is adapted to function as a reflective surface to reflect the light emitted from the LED chip 22. Thus, the light emitted from the LED chip 22 in the left, right, upper and lower directions (in FIG. 3B) progresses toward a side surface (opposite to the one side surface provided with the LEDs 21) of the light guide plate 11) while being reflected at the inner surfaces of the walls 23b, 23c, 23d and 23e and comes out from the opening area (emission surface).

In the embodiment, the opening area of the lamp house 23 (or the recess 23a) has a width W3 (distance from the inner surface of the left wall 23b to the inner surface of the right wall 23c) which is set to be smaller than the width W2 of the top end surface 13a of the protrusion 13 and at the same time larger than the width W1 of the proximal portion 14 of the protrusion 13. Moreover, the lamp house 23 has an overall width W4 (dimension along the longitudinal direction of the one side surface of the light guide plate 11) which is set to be larger than the width W2 of the top end surface 13a of the protrusion 13. The width W3 at the opening area of the lamp house 23 may be set smaller than the width W1 of the proximal portion 14.

The sealing portion 24 is formed of a transparent material (a silicone resin in the embodiment) which is filled inside the recess 23a of the lamp house 23 so as to cover the LED chip 22. A yellow florescent material, which emits a light having a yellow component when receiving a blue light emitted from the LED chip 22, is dispersed in the transparent material. Accordingly, the blue light emitted from the LED chip 22 and the yellow light emitted by means of the yellow florescent material are mixed with each other whereby a predetermined white light is produced and emitted from the opening of the recess 23a.

The first row LEDs 21a of the plurality of LEDs 21 structured as above description are each disposed close to the bottom surface 12a of the interspace 12 so that the sealing portion 24 opposes the center part of the bottom surface 12a.

The second row LEDs 21b, on the other hand, are each arranged close to the top end surface 13a of the protrusion 13 so that the entire area of the emission surface of the sealing portion 24 opposes the top end surface 13a, wherein, as indicated in FIG. 2, one lamp house end wall (for example, the right wall 23c) of the second row LED 21b is partly (part indicated by L in the figure) overlapped with one lamp house end wall (for example, the left wall 23b) of the first row LED 21a when viewed from the light emission direction.

The advantage of the spread illuminating apparatus 10 structured as above will now be described.

In the spread illuminating apparatus 10, the plurality of protrusions 13 disposed at one side surface of the light guide plate 11 each include the proximal portion 14 having a constant width. In the arrangement described above, the first row LEDs 21a having a rectangular shaped body are each accommodated efficiently at a rectangular open space which is defined between two adjacent proximal portions 14 and which is a part of the interspace 12 formed between two adjacent protrusions 13 or between the protrusion 13 and the end protrusion 16. Thus, the interspace 12 is efficient in reducing unwanted dead space.

Each of the protrusions 13 includes further the distal portion 15 whose width increases in accordance with an increase in the distance from the light guide plate 11, and the width W2 of the top end surface 13a of the distal portion 15 is set to be larger than the width W3 of the opening area of the lamp house 23 and at the same time smaller than the overall width W4 of the lamp house 23. In the arrangement as described above, since the light is mainly emitted from the opening area of the lamp house 23, much of the light emitted from the second row LED 21b can be brought into the protrusion 13a from the top end surface 13a.

Also, since the protrusion 13 includes the distal portion 15 and is formed such that the width W2 of the top end surface 13a is set to be larger than the width W3 of the opening area of the lamp house 23 of the second row LED 21b, the second row LED 21b is allowed to be shifted in location relative to the protrusion 13 with respect to the direction along the longitudinal direction of the side surface of the light guide plate 11. Therefore, the light emitted from the second row LED 21b can be adapted to stably enter the light guide plate 11. This structure is a big advantage in terms of manufacturing the light guide plate 11 when a large number of the LEDs 21 are disposed at the side surface of the light guide plate 11.

The light having entered the protrusion 13 is introduced toward the light guide plate 11 directly or after reflection on an inclined side surface 13b (side surface of the distal portion 15) of the protrusion 13. Therefore, the spread of light inside the light guide plate 11 can be controlled in accordance with the geometry (the length and the inclination angle) of the inclined side surface 13b of the protrusion 13.

Also, when the protrusion 13 is formed as described above, the pitch between two adjacent first row LEDs 21a can be smaller than the overall width W4 of the lamp house 23. That is to say, two adjacent LEDs 21 (specifically, the first row LED 21a and the second row LED 21b located next thereto) can be arranged so that the left end wall 23b of the lamp house 23 of one LED and the right end wall 23c of the lamp house 23 of the other LED are partly overlapped with each other.

Consequently, a larger number of LEDs 21 than conventionally can be disposed on one side surface of the light guide plate 11 without increasing the loss of light.

The present invention has been described with reference to a specific embodiment thereof but is not limited to the specific embodiment described, and various modifications and combinations are possible without departing from the spirit and scope of the present invention.

For example, in the embodiment described above, LEDs having the same wavelength characteristics (a so-called pseudo white LED) are used as both the first row LED 21a and the second row LED 21b, but the present invention is not limited to the above LED arrangement. For example, a single color LED, for example, a red LED may be used as the second row LED 21b while a pseudo white LED is used as the second row LED 21a. In this case, if the LEDs are lit for row by row (by wavelength characteristics), spread illumination light having excellent uniformity can be achieved. The LEDs do not necessarily have to have a wavelength of visible light but may have a wavelength of invisible light, such as ultraviolet light or infrared light.

Also, the proximal portion 14 of the protrusion 13 has a constant width in the embodiment described above, but the width of the proximal portion 14 does not have to be strictly constant. For example, if the proximal portion 14 is formed to have a width increasing slightly toward the end area, not so much increase as the width of the distal portion 15, the same or a certain level of effect can be expected. Moreover, the distal portion 15 is formed in the embodiment such that the width increases at a constant rate toward the top end portion, but the present invention is not limited to the formation. For example, the distal portion 15 may be formed such that the inclination angle of the inclined side surface 13b varies continuously.

In the embodiment described above, the LEDs 21 are arranged such that the respective lamp houses 23 of two adjacent LEDs 21 partly overlap with each other when viewed from the light emission direction, but the present invention is not limited to such an arrangement. The LEDs 21 may alternatively be arranged such that the respective lamp houses 23 of two adjacent LEDs 21 do not overlap with each other. In this case, the same level of effect as achieved in the embodiment described above can not be expected, but a certain level of effect can be expected.

What is claimed is:

1. A spread illuminating apparatus comprising:
   a light guide plate comprising a plurality of protrusions disposed along a side surface thereof such that a plurality of interspaces are formed with each interspace being located between two adjacent protrusions; and
   a plurality of point light sources which are disposed in two rows respectively at the interspaces and the protrusions and which each comprise a light emitting element chip, and a lamp house made of a reflective material and having a recess for storing the light emitting element chip at a center part thereof, wherein the protrusions each integrally comprise: a proximal portion which extends from the side surface and which has a substantially constant width; and a distal portion which extends further from the proximal portion and which has a width increasing in accordance with an increase in distance from the proximal portion, and wherein the distal portion of the protrusion has, at its top end surface, a width which is larger than a width of an opening area of the recess and also smaller than an overall width of the lamp house where the widths of the proximal and distal portions of the protrusion, the width of the opening area of the recess and the overall width of the lamp house are dimensions along a longitudinal direction of the side surface of the light guide plate.

2. A spread illuminating apparatus according to claim 1, wherein the plurality of point light sources disposed in two rows are arranged such that respective lamp houses of two adjacent point light sources partly overlap with each other when viewed from a light emission direction.

3. A spread illuminating apparatus according to claim 1, wherein the plurality of point light sources disposed in two rows have respective wavelength characteristics different from one row to another.

* * * * *